United States Patent [19]

Sakuraoka et al.

[11] Patent Number: 5,325,623
[45] Date of Patent: Jul. 5, 1994

[54] MATERIAL FOR MAKING MARINE STRUCTURE

[75] Inventors: Makoto Sakuraoka, Kobe; Tetuo Morita, Osaka; Shinichi Nakade, Itami; Akihiro Nakahara, Ibaragi; Tomoko Noyama, Takarazuka; Kimihiro Tanida, Nishinomiya, all of Japan

[73] Assignee: Sumitomo Rubber Industries, Ltd., Hyogo, Japan

[21] Appl. No.: 994,644

[22] Filed: Dec. 22, 1992

[30] Foreign Application Priority Data

Dec. 27, 1991 [JP] Japan .................. 3-346974
Dec. 27, 1991 [JP] Japan .................. 3-346983
Dec. 7, 1992 [JP] Japan .................. 4-326997

[51] Int. Cl.$^5$ .............................. A01K 69/08
[52] U.S. Cl. ..................... 43/100; 43/101; 43/102; 43/103; 43/104; 43/105
[58] Field of Search ............. 43/100, 101, 102, 103, 43/104, 105, 58; 525/368, 369, 386, 387; 524/397; 428/36.8, 36.91, 492, 493, 521

[56] References Cited

U.S. PATENT DOCUMENTS

| | | | |
|---|---|---|---|
| 1,300,954 | 4/1919 | Coray | 43/183 |
| 2,662,874 | 12/1953 | Brown | 525/386 |
| 3,821,861 | 7/1974 | Jalbert | 43/100 |
| 3,906,655 | 9/1975 | Lowenthal | 43/100 |
| 3,992,804 | 11/1976 | Senese | 43/103 |
| 4,191,671 | 3/1980 | Katoaka et al. | 524/397 |
| 4,195,436 | 4/1980 | Moure | 43/100 |
| 4,251,943 | 2/1981 | Sawlsville | 43/55 |
| 4,611,424 | 9/1986 | Tarantino | 43/102 |
| 4,759,149 | 7/1988 | Dunn | 43/102 |
| 4,987,192 | 1/1991 | Oberster et al. | 525/368 |
| 5,068,137 | 11/1991 | Osawa et al. | 428/521 |
| 5,077,108 | 12/1991 | Osawa et al. | 428/521 |

FOREIGN PATENT DOCUMENTS

| | | |
|---|---|---|
| 454411 | 10/1991 | European Pat. Off. . |
| 3918928 | 12/1989 | Fed. Rep. of Germany . |
| 60-34121 | 2/1985 | Japan . |
| 62-171627 | 7/1987 | Japan . |
| 2-106713 | 4/1990 | Japan . |
| 44241 | 1/1992 | Japan . |
| 2144311 | 3/1985 | United Kingdom . |

*Primary Examiner*—Veronica P. Hoke
*Attorney, Agent, or Firm*—Birch, Stewart, Kolasch & Birch

[57] ABSTRACT

A material for making marine structure comprises a rubber composition. The rubber composition contains a metal salt of $\alpha$, $\beta$-unsaturated fatty acid and is vulcanized in a mold into a predetermined configuration. The strength of the rubber composition is anisotropic and in particular its elastic modulus is anisotropic. The direction in which the strength of the rubber composition is high is set in the direction in which stress is applied by waves. Thus, the marine-structural material is resistant to waves and tide. The rubber composition contains short fibers which are oriented in a certain direction to increase the anisotropy of the rubber composition.

16 Claims, 5 Drawing Sheets

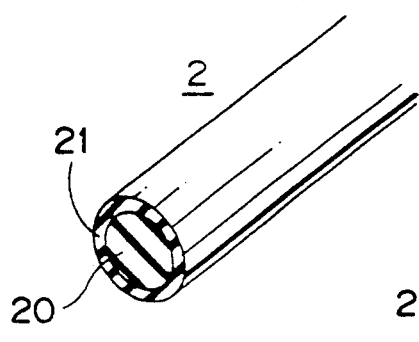
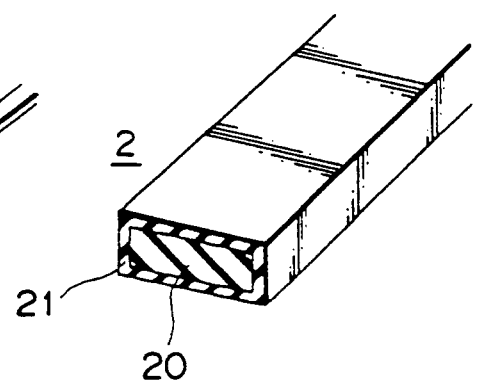
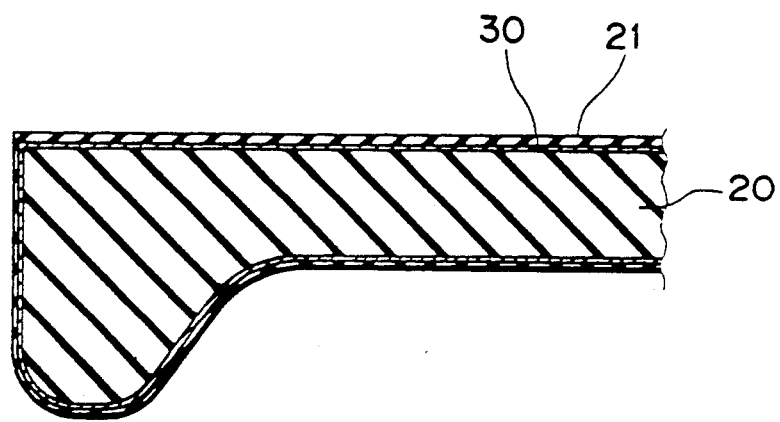

MATERIAL FOR MAKING MARINE STRUCTURE

BACKGROUND OF THE INVENTION

1. Field of the Invention

The present invention relates to a material for making marine structure and more particularly to a marinestructural material preferably used as a material for making a floating structure such as a fish-cultivating frame, a floating pontoon, a water surface-partitioning fence, a breakwater net or the like which are required to be water-proof, wave-resistant, tide-resistant, corrosion-resistant to the salt contained in sea-water, weather resistant, light, and strong.

2. Description of the Related Arts

In order for a marine-structural material to be durable for a long time, it is particularly important that the marine-structural material is not horizontally deformed against tides and vertically deformed against waves. That is, the marine-structural material must be strong enough to hold its original configuration in a horizontal direction (rigidity in a horizontal direction) against tides and have a high breaking extension so as to follow vertically against waves.

In addition, the marine-structural material is required to be corrosion-resistant to salt contained in sea-water, weather resistant, and wear-resistant light buoyant, strong, and inexpensive and processable.

A marine-structural material having the abovedescribed qualities is strongly demanded when used in a fish-cultivating frame or a pontoon.

Fish cultivating frames include a floating material enclosing a certain area of sea water and a net, having a bottom and hanging from the floating material so as to cultivate fish in the volume surrounded by the floating material and the net. Bamboo bars, wood bars or iron bars provided with floats are used in the fish-cultivating frame.

A fish-cultivating frame having bamboo or wood is normally small, namely, 15 m square. The frame is rigid but sufficiently flexible to follow the tide and waves. These frames are varied in size of limited and strength. Further, the bamboo or wood frame is corroded by sea water in a short period of time and thus it is difficult to use a large fishcultivating frame for a long time. Thus, the bamboo or wood frame cn be used as a coastal cultivating fish-cultivating frame in a bay in which waves are quiet, but cannot be used in an off-shore region.

Large fish-cultivating frames having iron bars provided with floats such as a 20 m square frame, a 40 m-diameter circular frame, and a polygonal frame have been proposed. Since the fish-cultivating frame using iron bars is corroded in a short period of time and is heavy, it is necessary to provide it with large floats. Further, the iron bars are rigid with a limited elastic deformable range. A large fish-cultivating frame having iron bars is incapable of following the swelling motion of waves, and is not durable because stress is repeatedly applied to the iron bar. A larger bar is required to prevent the frame from being deformed. As a result, it is necessary to provide the fishcultivating frame with larger floats. Thus, the fishcultivating frame using iron bars can be used as a coastal cultivating fish-cultivating frame in a bay in which waves are quiet, but cannot be used in an off-shore region.

Fish-cultivating frames for use in an off-shore region have been proposed in Japanese Patent Laid-Open Publication Nos. 60-34121 and 62-171627. These fish-cultivating frames follow the swelling motion of waves, which is strongly demanded. According to one proposed frame, bars each having a plurality of elastic circular hoses are connected to each other by joints. According to the latter proposed frame, bars each having a plurality of rigid materials are connected to each other by joints using flexible members.

These fish-cultivating frames of the above construction are capable of following the swelling motion of waves, but need reinforcing members, such as elastic circular hoses, which are utilized as the bars thereof. Therefore, the fish-cultivating frame is not rigid and has a low flexural rigidity in a horizontal direction. As a result, the ability these fish-cultivating frames to hold their original configuration is inferior, and thus the frames tend to be deformed.

Normally, Young's modulus E (flexural elastic modulus) of an elastic member reinforced with synthetic fiber is 2 to 3 kg/mm$^2$ and approximately only 5 kg/mm$^2$ even though elastic modulus thereof is great. The elastic modulus of iron is 20000 kg/mm$^2$.

The bar of the fish-cultivating frame including the reinforcing elastic member has a small in its elastic modulus and is thus deformable in a horizontal direction. In order to increase the frame's ability to hold its original configuration by reducing the degree of deformation, it is necessary to increase the sectional area of each bar so as to increase the shape factor (geometrical moment of inertia) thereof, i.e., increase the value of the flexural rigidity $E \times I$ thereof.

However, the geometrical moment of inertia I depends on the sectional configuration of the bar. That is, in a solid circular bar which is (d) in diameter, $I = \pi d^4/64$. In a hollow pipe where $d_1$ is the inner diameter and $d_2$ is the outer diameter $z = \pi(d_2^4 - d_1^4)/64$. Accordingly, in order to increase the geometrical moment of inertia, the sectional area of the bar becomes large, which leads to a large fish-cultivating frame that is expensive.

A pontoon is utilized as an anchorage of a yacht or a motor boat, as an unloading facility in a region where the difference between ebb and flow is great, and as a landing facility.

Generally, a pontoon includes frames each consisting of steel elements welded to each other in a truss configuration with a float made of concrete. Frame structures composed of wood combined with each other or with concrete have been proposed.

However, it is difficult for the pontoon of the above structure to follow the swelling motion of waves in a harbor in which waves swell greatly. In addition, the pontoon is not corrosion-resistant to sea-water.

Generally, pontoons used in an unloading facility or landing facility include a box made of iron covered with concrete. Thus, they are very expensive.

As described above, the following two structures are considered to improve durability of fish-cultivating frames pontoons and the like by allowing them to follow the swelling motion of waves.

1) The entire frame is rigid to prevent the bars defining the frame from being deformed vertically against waves, so that the frame is durable.

According to this structure, the rigidity of the bars in the horizontal direction is increased to improve the frame's performance for holding itself against tides.

However, steel pipes which have a large diameter are required. As a result, the frame is heavy and expensive.

2) The entire frame or a part thereof is flexible so that the entire frame follows the swelling motion of waves because the frame is deformed vertically.

In this case, the rigidity of the frame becomes low these decreasing the ability of the frame to hold its original configuration in the horizontal direction against tides.

The marine-structural material used to build fish-cultivating frames and pontoons are required to have the following requirements. As detailed below, conventional marine-structural material does not satisfy all of these requirements.

1) The marine-structural material should be hard and have a high flexural rigidity.

That is, it is necessary that the marine-structural material have the ability to hold its original configuration (rigidity in a horizontal direction) on the sea against tides. When the fish-cultivating frame is deformed, the volume for cultivating fish becomes small and as a result, the fish trapped within the net by collapse of the frame are injured or killed due to the lack of oxygen.

2) The marine-structural material must be durable.

The frame of the marine-structural material must have a high breaking extension that favorably follows the swelling motion of waves in a vertical direction. The marine-structural material must be resistant to flexural fatigue. In recent years, the location for fish-cultivation are moving more and more from areas near the coast to areas offshore. Therefore, a fish-cultivating frame is required to be able to favorably follow the swelling motion of waves in a vertical direction. The pontoon is also required to have similar performance characteristics for favorably following the swelling motion of waves in a vertical direction.

3) The marine-structural material must be light and corrosion-resistant to sea-water.

4) The marine-structural material must be easily shaped into a required configuration by molding and must be inexpensive.

The cost of the material must be sufficiently low to allow for economical building of large structures. The side of even a small fish-cultivating frame is 15 m and the frame of the pontoon is similarly large.

SUMMARY OF THE INVENTION

It is an object of the present invention to provide a material for making a marine structure (namely, marine-structural material) such as a fish-cultivating frame or a pontoon frame capable of holding it's original configuration against tides and waves.

It is another object of the present invention to provide a marine-structural material for use in building a fish-cultivating frame or a pontoon frame having performance characteristics that allow the structure to follow the swelling motion of waves and having strength (breaking extension) sufficient to withstand some force.

It is still another object of the present invention to provide a marine-structural material for use in building a fish-cultivating frame or a pontoon frame which is light and corrosion-resistant to sea-water so that the structure floats on the sea.

It is a further object of the present invention to provide an inexpensive marine-structural material such as a fish-cultivating frame or a pontoon frame.

In accomplishing these and other objects of the present invention, the material for marine structures such as the fish-cultivating frame, pontoon and the like, is composed of a rubber composition having a much higher elastic modulus than a conventional rubber product, so that the marinestructural material has a high flexural rigidity without an increased geometrical moment of inertia thereof, i.e., so that the marine-structural material holds its original configuration against waves without increasing the sectional area thereof.

More particularly the marinestructural material according to the present invention includes a rubber composition, comprising a metal salt of an alpha, beta-unsaturated ($\alpha$, $\beta$-unsaturated) fatty acid, vulcanized to shape the rubber composition into a predetermined configuration.

The rubber composition contains 100 parts by weight of base rubber; 10 to 70 parts by weight of $\alpha$, $\beta$-unsaturated fatty acid; 10 to 70 parts by weight of metal oxide; metal hydroxide or carbonate, and 0.5 to 5.0 parts by weight of organic peroxide.

As the base rubber, the following a conventional rubber composition can be used. For example, this rubber may be rubber, natural rubber, butadiene rubber, styrene-butadiene rubber, nitrile rubber and hydrogenated nitrile rubber, ethylene propylene rubber, chloroprene rubber, butyl rubber, urethane rubber, acrylic rubber, silicon rubber and the like. A mixture containing two or more of the above rubbers may be used as the base rubber. Cis-1,4-polybutadiene, especially cis-1,4-polybutadiene having a cis-structure of more than 90% or a mixture thereof may be most favorably used as the base rubber. The reason why a substance having a cis-structure of over 90% or more therein is preferably used as the base rubber is because graft copolymerization is easily accomplished with this substance, and because the number of linking points of rubber increases with the progress of crosslinking and, consequently, the elastic modulus and strength of the rubber can be improved.

Preferred $\alpha$, $\beta$-unsaturated fatty acids include monoethylenic unsaturated carboxylic acid having three to eight carbon atoms. Preferred monoethylenic unsaturated carboxylic acids include methacrylic acid, acrylic acid, iraconic acid or crotonic acid. A mixture containing two or more of these substances may be used.

The $\alpha$, $\beta$-unsaturated fatty acid is desirably contained in the rubber composition at 10 to 70 parts by weight, more desirably at 20 to 50 parts by weight with respect to 100 parts by weight of base rubber. If the $\alpha$, $\beta$-unsaturated fatty acid is contained in the rubber composition in amounts smaller than 10 parts by weight, the rubber composition does not have a sufficient strength, whereas if the $\alpha$, $\beta$-unsaturated fatty acid is contained in the rubber composition in amounts greater than 70 parts by weight, the rubber composition is very hard and as a result, inferior in processability and moldability.

The metal salt of the $\alpha$, $\beta$-unsaturated fatty acid is formed by kneading the mixture of metal oxide, metal hydroxide or carbonate and the $\alpha$, $\beta$-unsaturated fatty acid in the rubber composition. The metallic salt the of $\alpha$, $\beta$-unsaturated fatty acid serves as a co-cross-linking agent for the rubber. A bivalent metal, for example zinc or magnesium is preferably used as the metal to form the metallic salt of $\alpha$, $\beta$-unsaturated fatty acid, because zinc and magnesiaaccelerate graft copolymerization. As a result, the elastic modulus and strength of the rubber are improved. In addition to these divalent metals, sodium, lithium, or aluminum may be used as the metal to form the metal oxide, metal hydroxide or carbonate.

The metal oxide is contained in the rubber composition in an amount of 10 to 70 parts by weight, and preferably 20 to 50 parts by weight, with respect to 100 parts by weight of the base rubber for the previously described reasons. That is, if metal oxide is contained in the rubber composition in amounts smaller than 10 parts by weight, the rubber composition does not have sufficient strength, whereas if the metal oxide is contained in the rubber composition in amounts greater than 70 parts by weight, the rubber composition is very hard and as a result, is inferior in processability and moldability.

Instead of mixing $\alpha, \beta$-unsaturated fatty acid and metal salt with other components of the rubber composition, it is possible to form the metallic salt of the $\alpha, \beta$-unsaturated fatty acid by combining the $\alpha, \beta$-unsaturated fatty acid and the metal oxide, and then mixing the metal salt thus formed with the other components of the rubber composition. The metallic salt of the $\alpha, \beta$-unsaturated fatty acid is contained in the rubber composition in amounts of 20 to 100 parts by weight, and more preferably 40 to 80 parts by weight with respect to 100 parts by weight of the base rubber.

The organic peroxide may be selected from peroxybenzoic acid, benzoyl peroxide, cumene peroxide, dicumyl peroxide, 1-1-bis-t-butyl peroxy 3,3,5-trimethylcyclohexane, di-t-butyl peroxide, di-t-butyl peroxy-m-diisopropyl benzene, or 2,5-dimethyl-2,5-di-t-butyl peroxyhexane. Dicumyl peroxide is most preferably used as the organic peroxide.

The organic peroxide is contained in the rubber composition in amounts of 0.5 to 5.0 parts by weight, and more preferably 0.5 to 3.0 parts by weight with respect to 100 parts by weight of the base rubber. If the organic peroxide is contained in the rubber composition in amounts smaller than 0.5 parts by weight, the crosslinking of the $\alpha, \beta$-unsaturated fatty acid is not easily accomplished while if the organic peroxide is contained in the rubber compositions in amounts greater than 5.0 parts by weight, the rubber composition is frail, and hence cannot be practically used.

The components of the rubber composition are mixed under shearing force in a certain direction so as to have anisotropic strength thereof in a certain direction. Then, the rubber composition thus formed is vulcanized in a mold in this state. As a result, the molded rubber composition thus formed is anisotropic in the strength thereof.

As the present applicant previously disclosed in Japanese Patent Application No. 2-106713, when the components of the rubber composition are kneaded under shearing force thereto in a certain direction, the crystals of the metallic salt of $\alpha, \beta$-saturated fatty acid are oriented in the grain direction of the rubber. When the rubber composition formed is vulcanized in a mold, the molded rubber composition thus formed is anisotropically very strong in the grain direction of rubber but not as strong as in other directions, for example, vertically.

Due to the anisotropic molded rubber composition anisotropic as described above, the marine-structural material comprising the molded rubber composition is very rigid and has an ability to hold the original configuration thereof because the direction in which the molded rubber composition is very strong in the grain direction of rubber coincides with the axial direction thereof, namely, the direction in which the molded rubber composition is subjected to tensile force. In this manner, the marine-structural material has the ability to maintain the original configuration thereof favorably. Therefore, the long bar of the fish-cultivating frame floating on the sea is made of the molded rubber composition and the orientation of the strength is set in the axial direction of the bar so as to impart anisotropy to the bar. Thus, the elastic modulus of the bar in the axial direction thereof is made to be higher than the elastic modulus thereof in a direction perpendicular to the axial direction thereof. In this manner, the bar is deformed to a smaller extent by time which applies force to the bar in a horizontal direction and which applies tensile force thereto in the axial direction thereof. That is, the fish-cultivating frame is capable of withstanding the force of tide applied thereto.

According to the above-described construction, the marine-structural material obtained by vulcanizing the rubber composition is elastic and hence superior in following the swelling motion of waves and has the ability to hold the original configuration thereof due to its high flexural rigidity. In particular, since the strength in the marinestructural material is great in the direction in which it is deformed by tide, the marine-structural material has the ability of holding its original configuration. The molded rubber composition according to the present invention has a smaller sectional area than that of a conventional one having the same flexural rigidity.

Further, the marine-structural material according to the present invention has a high breaking extension and thus it is not easily broken even though it is distorted. In addition, since the marine-structural material is made of rubber, it is light and corrosion-resistant to the salt contained in sea-water. Furthermore, the rubber composition can be easily shaped into a predetermined configuration in a mold.

Short fibers may be mixed with the rubber composition containing the metal salt of $\alpha, \beta$-unsaturated fatty acid as a reinforcing material.

The following synthetic fibers and natural fibers may be used as the short fiber: carbon fiber, alumina fiber, aromatic polyamide fiber, carbonized silicon fiber, silica fiber, boron fiber, potassium titanate fiber, polyamide fiber, polyester fiber, polyvinyl alcohol fiber, polyacrylic fiber, polyacrylonitride fiber, polyvinyl chloride fiber, polyvinylidene chloride fiber, polyethylene fiber, polypropylene fiber, and polyurea fiber. Polyamide fiber (nylon in particular) and polyacrylonitride fiber are most favorable of the above fibers.

The fibers may be pretreated to strengthen them or to increase adhesion to the rubber. It is preferable to stretch short fibers and adhere them to each other so that the fibers have a great strength. In addition to RFL processing (Resorcinol Formaldehyde Latex), silane coupling agent or a mixture of the short fiber and a functional group, compatible with the rubber composition, grafted onto the short fiber may be used to further improve the strength and durability of the short fibers.

The length of the short fiber ranges from 10 $\mu$m to 30 mm. More favorably, it ranges from 1 to 10 mm. The ratio (L/D) of the length (L) of the short fiber to the diameter (D) thereof is greater than 10. More favorably, it ranges from 50 to 1000. If the ratio (L/D) is smaller than 10, rubber cannot be reinforced sufficiently by the short fiber in the circumferential direction of a roll.

The short fiber is contained in the rubber composition at 5 to 30 parts by weight and more favorably 10 to 20 parts by weight with respect to 100 parts by weight of the base rubber. If the short fiber is contained in the rubber composition in amounts smaller than five parts by weight, the strength of the rubber composition is insufficient while if the short fiber is contained in the rubber composition in amounts greater than 30 parts by weight, a problem occurs in the moldability of the rubber composition.

The components of the rubber composition containing the short fibers are kneaded by applying shearing force thereto in a certain direction so as to orient the short fibers in a certain direction. Then, the rubber composition is vulcanized in a mold in this state. As a result, the molded rubber article has a great strength in the direction of the orientation of the short fibers.

When the components of the rubber composition are kneaded by applying shearing force thereto in a certain direction, the crystals of the metal salt of $\alpha, \beta$-saturated fatty acid are oriented in the grain direction of rubber and the short fibers contained in the rubber composition orient in the grain direction of rubber. When the rubber composition thus formed by kneading the components is vulcanized in a mold, a molded rubber composition is obtained. The molded rubber composition has an anisotropic strength which is very strong in the grain direction of rubber but not as strong as in other directions, for example, vertically.

Accordingly, the marine-structural material has the ability of maintaining the original configuration thereof favorably against tide and waves. The long bar of the fish-cultivating frame floating on the sea is made of the molded rubber composition and the short fibers are oriented in the axial direction of the bar so as to impart anisotropic strength to the molded rubber composition. Thus, the elastic modulus of the bar in the axial direction thereof is made to be higher than the elastic modulus thereof in a direction perpendicular to the axial direction thereof. As a result, the deformation degree of the bar can be effectively reduced against side waves which acts on the bar in a horizontal direction and applies tensile force thereto in the axial direction thereof. That is, the fish-cultivating frame is capable of withstanding the force of waves and tide applied thereto.

Further, the present invention provides a marines-tructural material comprising an inner core composed of a first rubber composition including the metal salt of $\alpha, \beta$-unsaturated fatty acid and an outer layer composed of a second rubber composition superior in weatherability, corrosionresistance, and crack-resistance. That is, the characteristic of the rubber composition of the inner core is different from that of the rubber composition of the outer layer. The rubber composition of the inner core has a much higher elastic modulus than a conventional rubber product, so that the marine-structural material has a high flexural rigidity without increasing the geometrical moment of inertia thereof, i.e., the marine-structural material has performance for holding the original configuration thereof against tide and waves without increasing the sectional area thereof. The rubber composition of the outer layer is superior in weatherability, is wear-resistant, is easily separated from a mold and is inexpensive. In addition, the rubber composition of the outer layer is light and corrosion-resistant.

In addition to the rubbers previously described, as the base rubber of the rubber composition composing the inner core, isoprene rubber, natural rubber, butadiene rubber, styrene-butadiene rubber are preferably used.

As the rubber which has been composition composing the outer layer, natural rubber sulfur-vulcanized and reinforced with carbon is preferably used. In addition, rubber which is inexpensive, abrasion-resistant, superior in weatherability, waterproof, crack-resistance, not easily cut, and easily separable from the mold is preferably used.

Crack-resistance of the rubber composition can be improved by a fiber layer interposed between the rubber composition of the inner core and the rubber composition of the outer layer. Preferably, the fiber layer consists of chemical fiber such as polyester, nylon or the like, fabric such as cotton, or cord-shaped fiber for use in a tire.

The bar of the marine-structural material vulcanized in a mold is sectionally rectangular or circular and used as a fish-cultivating frame or a pontoon frame. Connecting tools are installed on both ends of each bar by insertion molding or after molding is completed.

The ratio between the thickness of the inner core and that of the outer layer is selected depending on the sectional configuration of a marine-structural material. Preferably, the thickness of the outer layer is greater than 1 mm and smaller than 20 mm.

In the two-layer construction, since the outer layer of each bar consists of the rubber composition preferable in weatherability and abrasion-resistance, the bar is resistant to ozone and sun light to a great extent, and in addition, the outer surface of each bar is abraded to a smaller extent by ships, floating wood, and other bars. Further, even though the outer layer may become cracked, the crack can be prevented from spreading further. Thus, the marine-structural material is durable. The rubber composition composing the outer layer of the marine-structural material is less expensive than the rubber composition composing the inner layer thereof and easily separable from a mold and thus can be easily shaped.

BRIEF DESCRIPTION OF THE DRAWINGS

These and other objects and features of the present invention will become clear from the following description taken in conjunction with the preferred embodiments thereof with reference to the accompanying drawings, in which:

FIGS. 8A and 8B are schematic views showing bars according to another embodiment of the present invention; and FIG. 9 is a sectional view, showing a bar, similar to that of FIG. 7, according to fourth embodiment of the present invention.

Figure 1:
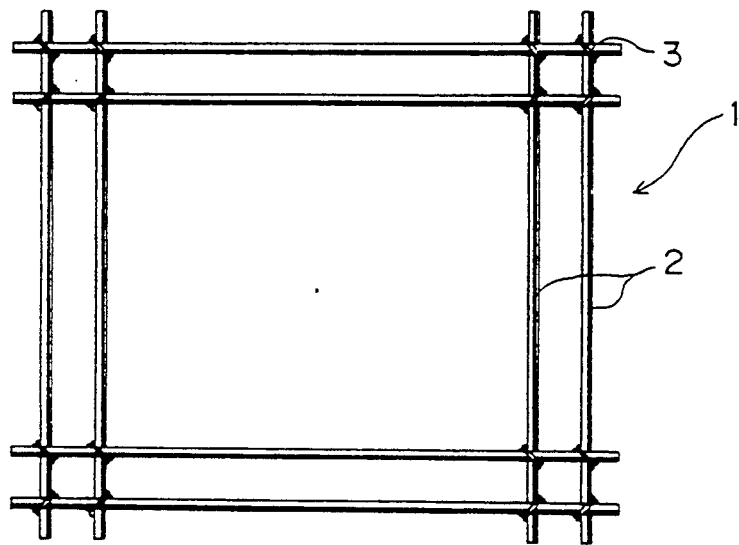
FIG. 1 is a schematic plan view showing a fish-cultivating frame according to a first embodiment of the present invention.

According to the first embodiment, as the base rubber, the mixture of cis-1,4-polybutadiene rubber (BR), natural rubber (NR) and ethylenepropylene rubber (EPDM) superior in weatherability is used. Basic methacrylic acid (MAA) is used as the $\alpha$, $\beta$-unsaturated fatty acid. Zinc oxide (ZnO) is used as metal oxide. Dicumylperoxide (DCP) is used as the organic peroxide.

According to the first embodiment, two kinds (A and B) of examples are prepared as shown in Table 1 and the properties thereof in normal state were measured.

TABLE 1

| | substance (parts by weight) | | | | | | | property in normal condition | | | | |
|---|---|---|---|---|---|---|---|---|---|---|---|---|
| | BR | NR | EPDM | MAA | ZnO | DCP | | $M_{10}$ | TB | EB | TR | E |
| A | 100 | — | — | 40 | 42 | 1 | grain | 8.4 | 21.1 | 64 | 78.6 | 52.8 |
| | | | | | | | vertical | 4.9 | 16.4 | 104 | 63.8 | 32.4 |
| B | 70 | 15 | 15 | 40 | 42 | 1 | grain | 10.1 | 25.5 | 63 | 89.3 | 45.0 |
| | | | | | | | vertical | 5.9 | 19.8 | 104 | 72.5 | 25.9 |

Tests of the properties were conducted in accordance with JIS K6301 and JIS K7055.
Grain: property in the roll direction (axial direction of bar)
vertical: property in a direction perpendicular to the roll direction
$M_{10}$: 10% modulus (MPa)
TR: tearing strength (KN/m)
$T_B$: tensile strength (MPa)
E: flexural elastic modulus (kg/mm$^2$)
$E_B$: breaking extension

DETAILED DESCRIPTION OF THE INVENTION

In the description of the following present invention, it is to be noted that like parts are designated by like reference numerals throughout the accompanying drawings.

A marine-structural material according to an embodiment of the present invention will be described below with reference to the drawings.

Figure 2:
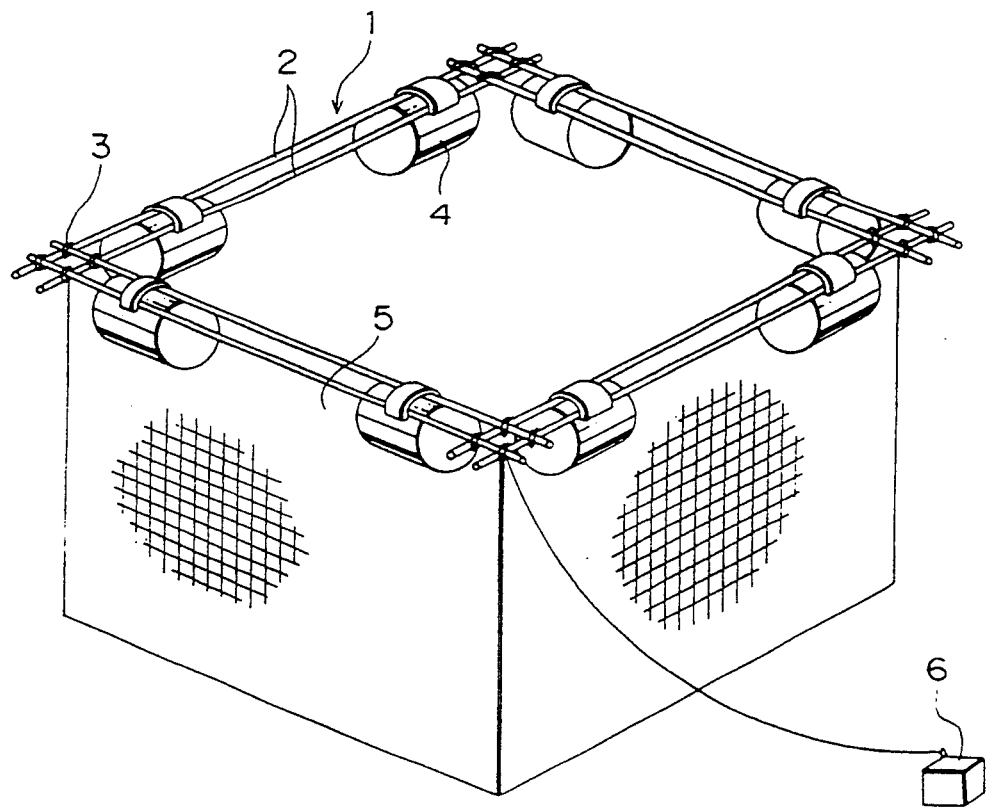
FIG. 2 is a schematic perspective view showing the fish-cultivating frame of FIG. 1.
Figure 3:
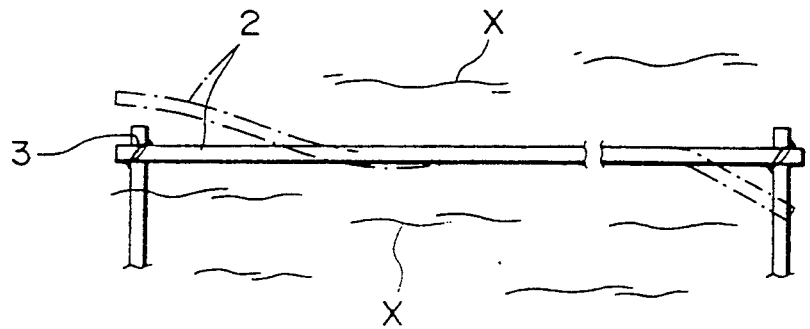
FIG. 3 is a view showing a wave-acting direction with respect to a bar of a fish-cultivating frame.

A first embodiment of the present invention will be described below with reference to FIGS. 1 and 2. The first embodiment relates to a fish-cultivating frame. The configuration of the fish-cultivating frame 1 is similar to that of conventional frames. That is, two long solid bars 2, which are 10 m long and sectionally circular, are arranged horizontally to constitute each side of a frame 1. The bars 2 are connected with each other at four corners thereof by connecting tools 3 consisting of a wire to form the frame 1 square in plan view. Floats 4, disposed at regular intervals, hang from each side consisting of the two bars 2. A net 5, having a bottom, and hangs from the frame 1. A mooring rope 6 is connected with the frame 1 at a required position thereof.

The construction of the frame 1 is not limited to the above. For example, L-shaped joints are formed at each corner of the frame 1 and flanges are formed at each joint portion between the bars 2 and the joints so as to fasten each joint to each flange by fasteners. The fastener may be composed of the same rubber composition as those which will be described below or an elastic material more flexible than the rubber composition. The bar 2 may be hollow.

The bar 2 is formed as $\alpha$, $\beta$-unsaturated fatty acid, metal oxide, and organic peroxide are added to a base rubber at a predetermined percentage by weight. Then, the mixture is kneaded under shearing force thereto in a certain direction. Then, the mixture is put into a mold for vulcanization, with the crystals of the metal salt of $\alpha$, $\beta$-unsaturated fatty acid oriented in the grain direction of the rubber in such a manner that the orientation of the metallic salt coincides with the axial direction of the bar 2.

Preferably, to achieve the ability to hold its original configuration of the frame 1, its flexural rigidity $E \times I$ is greater than 0.003 Ton-m$^2$ supposing that the frame 1 is 10 m square. The higher the flexural rigidity $E \times I$ is, the greater the ability of frame 1 to hold its original configuration.

The elastic modulus E of the bar 2, which is 10 m long, comprising the above-described rubber composition according to the present invention is as high as 40 to 50 kg/mm$^2$ in the grain direction of rubber. Therefore, the above-described flexural rigidity can be obtained without making the value of the geometrical moment of inertia I of the bar 2 large, namely, without making the sectional area thereof large.

The elastic modulus E of conventional rubber is normally 0.01 to 0.5 kg/mm$^2$ = (0.01 to 0.5) $\times 10^6$ kg/m$^2$.

In order to obtain the flexural rigidity EI = 3 kg/m$^2$ by using a solid circular bar consisting of conventional rubber and having E = 0.01 kg/m$^2$, the geometrical moment of inertia (I) of the solid bar is as follows:

$$I = E \times I/I = 3/(0.01 \times 10^6) = 0.0003 \text{ m}^2$$

$$\pi d^4/64 = 0.0003.$$

Accordingly, d = 0.280 m. Thus, it is necessary that the diameter of the solid bar is 28 cm.

The elastic modulus E of the bar 2 consisting of the rubber composition according to the present invention is 40 kg/cm$^2$ to 50 kg/cm$^2$. Supposing that a solid circular bar of E = 40 kg/cm$^2$ is used, d = 0.0352 m is obtained from a calculation similar to the above. Thus, in order to obtain the flexural rigidity EI = 3 kg/m$^2$, the diameter of a solid circular bar according to the present invention is as small as 3.5 cm.

When a solid circular bar, which is 5 cm long in diameter, consisting of the rubber composition according to the present invention is used in consideration of operational performance and processability of rubber, the flexural rigidity of the bar is as follows:

$$E \times I = 40 \times 10^6 \times \pi \times (0.05)^4 \div 64 = 0.012 \text{ Ton-m}^2$$

Thus, the bar 2 which is 10 m long has a sufficient flexure rigidity.

When a solid circular bar, having a diameter of 10 cm, consisting of the rubber composition according to the present invention is used, the flexural rigidity is as follows:

$$E \times I = 0.196 Ton\text{-}m^2.$$

Thus, the bar can be applied to a large fish-cultivating frame.

There is a possibility that the long bar 2 floating on the sea is deformed by tide (X) in a horizontal direction. Subjected to the tide (X), tensile force is applied to the long bar 2 in its axial direction. As a result, the bar 2 is liable to be distorted in its axial direction.

Usually when the distortion has occurred, the original configuration of the square frame cannot be maintained. That is, the bars are distorted in the direction in which the bars opposed to each other become close to each other. As a result, the area of the square frame becomes narrow. That is, the volume for cultivating fish decreases and as a result, fish is injured or killed by the lack of oxygen.

The frame 1 consisting of the rubber composition according to the present invention has a high strength in the axial direction thereof because the elastic modulus of the bars 2 high. Therefore, the frame 1 has an ability of maintaining the original configuration thereof, thus preventing the deformation thereof or decreasing the degree of deformation against tide. That is, the frame 1 withstands waves and tide to a high extent.

The bar 2 is deformed vertically by waves. As a result, the bar 2 is distorted by several percentages. In consideration of the durability of the bar 2, it is necessary that the breaking extension thereof is greater than 10%. The bar 2 consisting of the rubber composition according to the present invention has a breaking extension in the range from 10% to 100%.

Table 2 shows the elastic modulus, breaking extension, and other important properties of the rubber composition, according to the present invention, composing the bar 2, and those of other materials.

TABLE 2

| | $E (kg/mm^2)$ | breaking extension % | rusty corosion | configuration selectivity | price |
|---|---|---|---|---|---|
| rubber of present invention | 10~80 | 10~100 ⊚ | ⊚ | ⊚ | ⊚ inexpensive |
| conventional rubber | 0.01~0.5 | 100~600 ⊚ | ⊚ | ⊚ | |
| elastic hose | 2~5 | 10~50 ⊚ | ⊚ | Δ | X |
| bamboo | 1000 | | Δ | X | O |
| FRP | ~5000 | ~5 O | Δ | X | X |
| iron pipe | 20000 | ~0.5 X | X | Δ | Δ |

In Table 2, the elastic modulus E was measured in accordance with JIS K-7055.

In Table 2, ⊚ is superior. Δ is ordinary. X is inferior. As indicated by Table 2, the rubber composition of the present invention has the highest elastic modulus E of all the materials having the breaking extension greater than 10% and a favorable performance of following the motion of waves. In addition, the rubber composition of the present invention is rustproof and corrosion-resistant to sea-water and can be shaped into a desired configuration, and further, is inexpensive. Thus, the rubber composition of the present invention is superior as the material of the fish-cultivating frame to any other materials.

Figure 4:
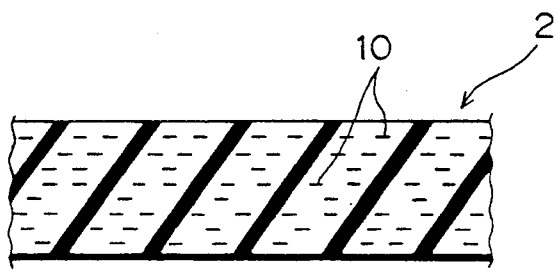
FIG. 4 is a partial enlarged sectional view showing bars of a fish-cultivating frame according to a second embodiment of the present invention.

A marine-structural material according to a second embodiment of the present invention will be described below with reference to FIG. 4, which is a sectional view showing the marine-structural material. The marine-structural material according to the second embodiment composes the bar 2 of the fish-cultivating frame 1 shown in FIGS. 1 and 2.

The circular bar 2 of the fish-cultivating frame 1 is made of a rubber composition containing short fiber 10. The rubber composition is vulcanized in a mold with the short fiber 10 oriented in the axial direction of the bar 2.

The same rubber composition as the one according to the first embodiment is used to compose the bar 2. The short fiber 10 is added to the rubber composition at a predetermined weight percentage. Then, the mixture of the rubber composition and the short fiber 10 is kneaded under shearing force thereto in a certain direction. Then, the mixture is put into a mold for vulcanization, with the short fiber 10 oriented in the axial direction of the bar 2.

As the short fiber 10, PAN group fiber manufactured by Toray Co., Ltd. is used. The diameter of the short fiber 10 is 16 $\mu/n$ (denier: 2d) and aspect ratio is 310.

According to the second embodiment, two kinds (kind A and kind B) of examples were prepared as shown in Table 3 and the properties thereof in normal state were measured. The length of the short fiber 10 were 5 mm (kind A) and 2 mm (kind B).

Comparison examples of kind C and kind D were formed to compare the bar 2 reinforced with the short fiber 10 with the bar 2 not reinforced therewith.

TABLE 3

| | embodiment | | comparisons | |
|---|---|---|---|---|
| component (parts by weight) | A | B | C | D |
| butadiene | 70 | 70 | 100 | 70 |
| natural rubber | 15 | 15 | — | 15 |
| ethylene propylene rubber | 15 | 15 | — | 15 |
| basic methacrylic acid | 40 | 40 | 40 | 40 |
| zinc oxide | 42 | 42 | 42 | 42 |
| short fiber | 15(5) | 15(2) | — | — |
| dicumyl per oxide | 1 | 1 | 1 | 1 |
| property in normal state | | | | |
| $M_{10}$ (MPa) grain | 28.9 | 25.9 | 8.4 | 10.1 |
| vertical | 5.2 | 4.2 | 4.9 | 5.9 |
| $T_B$ (MPa) grain | 32.3 | 35.9 | 21.1 | 25.5 |
| vertical | 9.4 | 10.4 | 16.4 | 19.8 |
| $E_B$ (%) grain | 14 | 19 | 64 | 63 |
| vertical | 20 | 24 | 104 | 91 |
| TR (KN/m) grain | 99.5 | 118.1 | 78.6 | 89.3 |
| vertical | 31.6 | 37.5 | 63.8 | 72.5 |
| $H_S$ (JIS-C) | 82 | 84 | 70 | 70 |
| flexural elastic modulus | | | | |
| E ($kg/mm^2$) grain | 87.2 | 123.0 | 52.8 | 45.0 |
| vertical | 27.5 | 48.0 | 32.4 | 25.9 |

The properties of the substances shown in Table 3 were measured in accordance with JIS K6301. The elastic modules was measured in accordance with JIS K-7055.

The elastic modulus E of the bar 2, which is 10 m long, comprising the rubber composition according to the second embodiment is as high as 40 to 120 kg/mm². Therefore, a required flexural rigidity can be obtained without making the value of the geometrical moment of inertia I of the bar 2 large, namely, without making the sectional area thereof large.

As shown in Table 3, the kind A and B have an elastic modulus from 87 to 123 kg/mm² in the grain direction and from 27 to 48 kg/mm² in a vertical direction.

In conventional rubber, $E = 0.01$ to $0.5$ kg/mm² $= (0.01$ to $0.5) \times 10^6$ kg/m².

Supposing that the elastic modulus E of the rubber composition is 40 kg/mm² in the vertical direction, the elastic modulus in the grain direction of rubber for orienting the short fiber 10 is 120 kg/mm² as indicated in Table 3. Thus, the flexural rigidity in the axial direction of the rubber composition can be further increased. That is, supposing that the elastic modulus of a solid circular bar which is 10 cm in diameter is 120 kg/mm² in the grain direction, the flexural rigidity of the solid circular bar is 0.588 Ton-m² in the grain direction.

As described above, according to the second embodiment, the rubber composition is reinforced with short fiber and the short fiber was oriented in a certain direction to increase the strength of the bar in the axial direction. Accordingly, the ability of the bar 2 for holding the original configuration of the fish-cultivating frame 1 is superior to that of the bar 2 according to the first embodiment.

A marine-structural material according to a third embodiment of the present invention is described below with reference to FIGS. 5 through 7.

Figure 5:
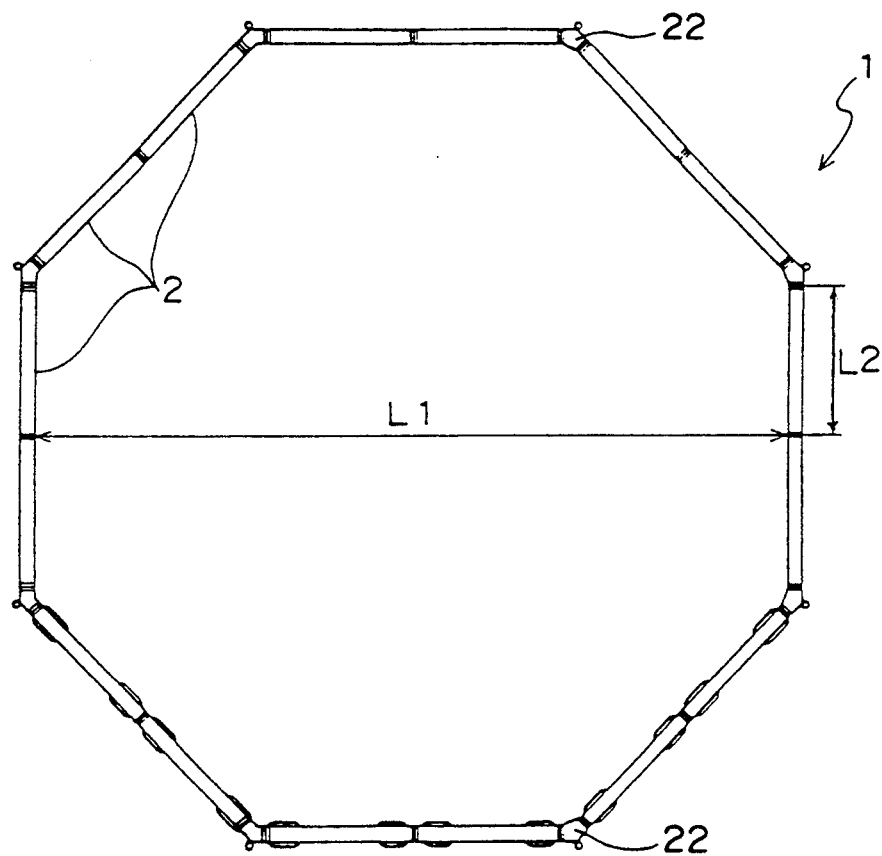
FIG. 5 is a plan view showing a fish-cultivating frame according to a third embodiment of the present invention.

FIG. 5 is a plan view showing a fish-cultivating frame 1. Long bars 2 consisting of marine-structural material according to the third embodiment are connected with each other via iron connecting tools 22 to forman octagonal fish-cultivating frame 1. Although not shown, floats hang from the bars 2 at regular intervals. A net having a bottom hangs from the bars 2 and a mooring rope 6 is connected with the frame 1 at a required position.

Each bar 2 has a configuration as shown in FIG. 6. That is, the bar 2 is sectionally channel-shaped and flat in the upper surface and has projections 2a formed on both sides of the lower surface thereof.

The length L1 between opposed sides of the octagonal fish-cultivating frame 1 is approximately 20 m. The length L2 of each bar 2 in its axial direction is approximately 4 m, the width S thereof is 40 cm, and the thickness W1 thereof is 50 mm at the center except both sides having a thickness W2 of 125 mm.

An insert-molded iron connecting flange 23 is mounted on each bar 2 at each end thereof in its axial direction. A mounting opening 23a is formed through the flange 23. The adjacent bars 2 are connected with each other by fastening bolts with nuts, with the bolts inserted through mounting openings 23a of the flange 23 in contact with the bars 2.

An insert-molded iron plate 24 is mounted on each bar 2 in required places so as to mount the floats and the connecting rope of the mooring rope on the mounting openings 24a formed through the iron plate 24.

The configuration of each bar 2 is not limited to the abovedescribed one. For example, each bar 2 is sectionally circular as shown in FIG. 8A or sectionally rectangular as shown in FIG. 8B.

Figure 7:
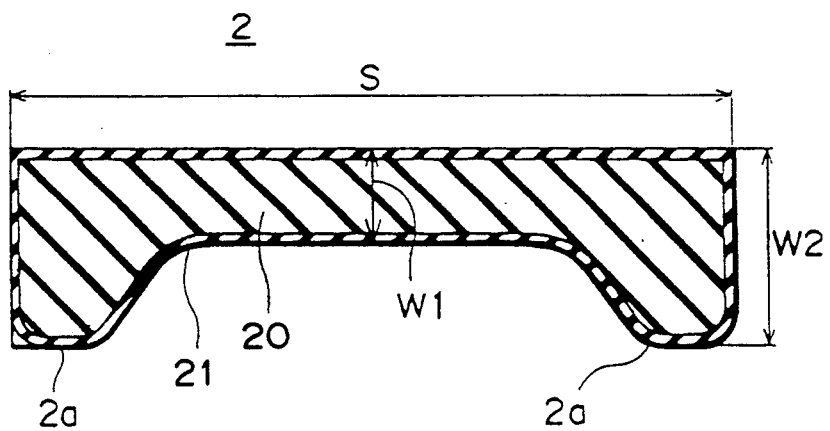
FIG. 7 is an enlarged sectional view showing the bar according to the third embodiment of the present invention.
Figure 6A:
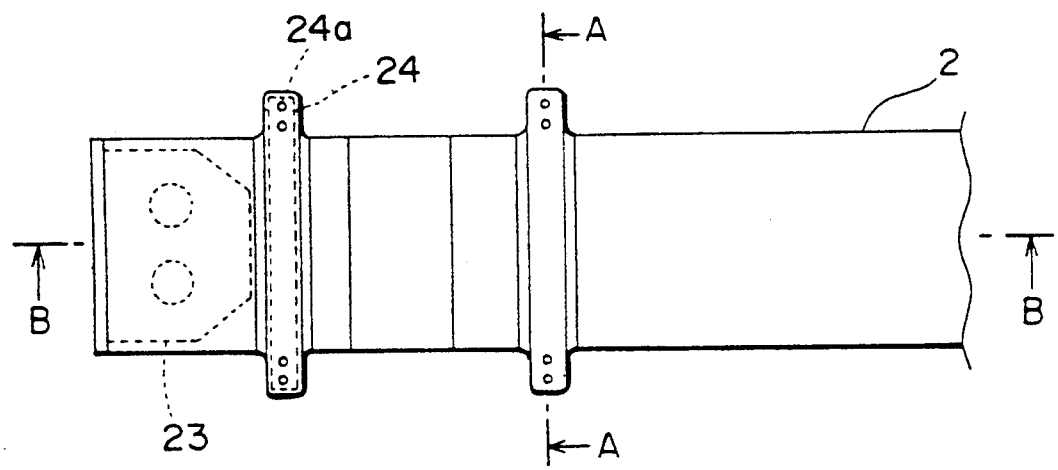
FIG. 6A is a plan view showing the bar of the fishcultivating frame according to the third embodiment of the present invention.
Figure 6B:
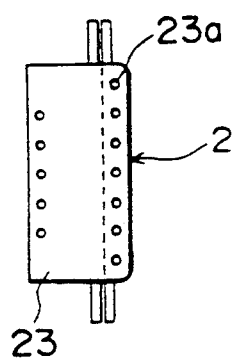
FIG. 6B is a left side elevation showing the bar of the fish-cultivating frame of FIG. 6A.
Figure 6C:
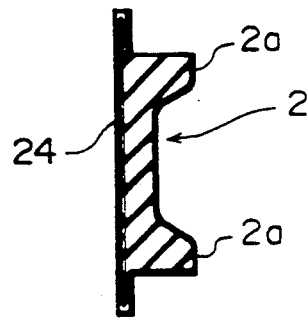
FIG. 6C is a sectional view showing the bar of the fish-cultivating frame taken along the line A—A of FIG. 6A.
Figure 6D:
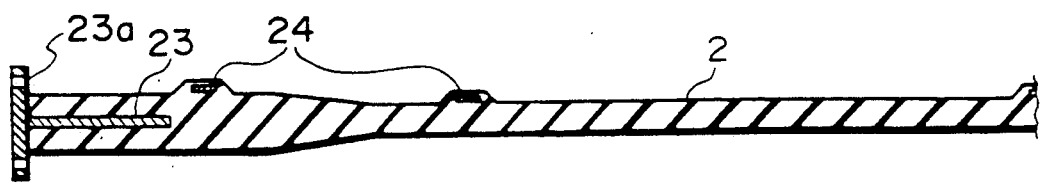
FIG. 6D is a sectional view showing the bar of the fish-cultivating frame taken along the line B—B of FIG. 6A.

The bar 2 has a two-layer construction as shown in FIG. 7. That is, the bar 2 comprises an inner core 20 and an outer layer 21 surrounding the entire periphery of the inner core 20. The inner core 20 and the outer layer 21 are made of a rubber composition, respectively. Both rubber compositions are vulcanized in a mold to shape them into the abovedescribed configuration, with the result that they are integrated with each other.

According to the third embodiment, as the base rubber of the rubber composition of the inner core 20, cis-1,4-polybutadiene rubber (BR) is used. Basic methacrylic acid (MAA) is used as the $\alpha, \beta$-unsaturated fatty acid. Zinc oxide (ZnO) is used as metal oxide. Dicumylperoxide (DCP) is used as organic peroxide.

The above substances are contained in the rubber composition composing the inner core 20 at the following percentage by weight. Base rubber: 100, $\alpha, \beta$-unsaturated fatty acid: 30, metal oxide: 32, and organic peroxide: 1.

Natural rubber (NR) is used as the base rubber of the rubber composition composing the outer layer 21. The following substances are contained in the rubber composition at the following percentage by weight. Base rubber: 100, zinc oxide: 3, high abrasion furnace carbon black 60, aromatic oil: 3, paraffin wax: 1, and sulphur: 2.

In addition to the above-described substances, the rubber composition of the inner core 20 and that of the outer layer 21 may consist of one of the rubber compositions shown in Table 4 or a mixture thereof.

TABLE 4

| main component | rubber-contained compound containing metal salt of $\alpha, \beta$-unsatured fatty acid | | | | | | | conventional rubber-contained compound | | | | | |
|---|---|---|---|---|---|---|---|---|---|---|---|---|---|
| B R  | 100 | — | — | — | — | — | — | 100 | — | — | — | — | — |
| N R  | — | 100 | — | — | — | — | — | — | 100 | — | — | — | — |
| I R  | — | — | 100 | — | — | — | — | — | — | 100 | — | — | — |
| SBR  | — | — | — | 100 | — | — | — | — | — | — | 100 | — | — |
| NBR  | — | — | — | — | 100 | — | — | — | — | — | — | 100 | — |
| S-NBR | — | — | — | — | — | 100 | — | — | — | — | — | — | — |
| EPDM | — | — | — | — | — | — | 100 | — | — | — | — | — | 100 |
| MAA  | 30 | 30 | 30 | 30 | 30 | 30 | 30 | — | — | — | — | — | — |
| ZnO  | 32 | 32 | 32 | 32 | 32 | 32 | 32 | 3 | 3 | 3 | 3 | 3 | 3 |
| DCP  | 1 | 1 | 1 | 1 | 1 | 1 | 1 | — | — | — | — | — | — |
| HAF  | — | — | — | — | — | — | — | 60 | 60 | 60 | 60 | — | — |
| FEF  | — | — | — | — | — | — | — | — | — | — | — | 40 | 100 |
| aromatic oil | — | — | — | — | — | — | — | 15 | 3 | 3 | — | — | — |
| paraffin wax | — | — | — | — | — | — | — | 1 | 1 | 1 | 1 | 1 | — |
| sulfur | — | — | — | — | — | — | — | 2 | 2 | 2 | 2 | 2 | 2 |
| hardness JIS A | 93 | 90 | 89 | 95 | 95 | 95 | 91 | 58 | 68 | 65 | 59 | 64 | 64 |
| JIS C | 74 | 69 | 67 | 77 | 79 | 77 | 70 | 21 | 35 | 33 | 23 | 26 | 26 |

TABLE 4-continued

| main component | rubber-contained compound containing metal salt of α, β-unsaturated fatty acid | | | | | | | conventional rubber-contained compound | | | | | |
|---|---|---|---|---|---|---|---|---|---|---|---|---|---|
| tensile strength TB | 32 | 29 | 27 | 18 | 22 | 23 | 13 | 17 | 27 | 24 | 21 | 19 | 10 |
| breaking extension EB % | 90 | 280 | 250 | 240 | 140 | 200 | 140 | 650 | 500 | 480 | 545 | 480 | 395 |
| tearing strength TR | 102 | 115 | 95 | 48 | 38 | 99 | 35 | 40 | 100 | 96 | 49 | 43 | 37 |
| flexural elastic modulus E | 25 | 20 | 18 | 27 | 29 | 34 | 22 | 0.5 | 0.6 | 0.6 | 0.5 | 0.6 | 0.6 |
| ozone test elongated by 10% 50 pphm 40° C. 72 Hr | broken | broken | broken | A-4 | borken | broken |  | O | O | O | O | O | A-4 | O |
| crack 30%-bending 500,000 times | broken 1,000 | broken 100,000 | broken 90,000 | broken 20,000 | broken 20,000 | broken 30,000 | broken 10,000 | O | O | O | O | O | O |

BR: butadiene
NR: natural rubber
IR: isoprene rubber
SBR: stylene-butadiene rubber
NBR: acrylonitrile-butadiene rubber
S-NBR: acrylonitrile-butadiene rubber hydride
EPDM: ethylene propylene rubber
MAA: basic methacrylic acid (α, β-unsaturated fatty acid)
ZnO: zinc oxide (metal oxide)
DCP: dicumylperoxide (organic peroxide)
HAF: high abrasion furnace carbon black
FEF: first extruding furnace carbon black The properties of the rubber composition of the inner core 20 and the outer layer 21, namely, hardness HS-JIS A, JIS C, tensile strength TB [MPs], breaking extension EB [%], tearing strength TR [KN/m], flexural elastic modulus E[Kg/mm$^2$] are as shown in Table 4.

The hardness, tensile strength, breaking extension, and tearing strength of Table 4 show experimental results conducted in accordance with JIS K6301. The flexural elastic modulus of Table 4 show experimental results conducted in accordance with JIS K7055.

The flexural elastic modulus E of the rubber composition of the inner core 20 ranges from 18 to 29. The flexural elastic modulus E of the conventional rubber composition (rubber composition composing the outer layer shown in Table 4) ranges from 0.5 to 0.6. Apparently, the flexural elastic modulus of the former is much higher than that of the latter.

Since the rubber composition having a large flexural elastic modulus composes the inner core 20, the configuration-holding ability of the bar 2 is great. Therefore, it is unnecessary to make the sectional configuration of the bar 2 large because the bar 2 withstands force applied by tides to a great extent, i.e., the bar 2 is not easily deformed in a horizontal direction against the tide.

The breaking extension of the rubber composition composing the inner core 20 is as small as 90% to 280% compared with the rubber composition composing the outer layer 21 but larger than other materials such as FRP (fiber reinforced plastics: approximately 5%) and an iron pipe (0.5%). In addition, the breaking extension of the outer 21 is as large as 400% to 650%. Thus, the bar 2 is capable of preferably following the swelling motion of waves and thus is deformed vertically in a smaller extent.

The rubber composition composing the outer layer 21 is superior in weatherability and crack-resistance.

That is, tests were conducted in accordance with JIS K6301 to examine the deterioration degree of the rubber composition composing the outer layer 21 by subjecting it to ozone in air. The test was conducted in the following condition. Ozone density: 50 pphm, temperature: 40° C., period of time: 72 hours; and test pieces consisting of the rubber composition were elongated by 10%. It was proved that the rubber composition of the outer layer 21 was resistant to ozone because no breakage occurred in the rubber composition composing the outer layer 21.

Flexural tests were conducted in accordance with JIS K6301 to examine crack-resistance of the rubber composition composing the outer layer 21. It was proved that the rubber composition was resistant to ozone because the rubber composition was not broken although 30%-bending was repeated 500,000 times.

As shown in Table 4, the rubber composition composing the inner core 20 is inferior to that of the outer layer 21 in terms of weatherability and crack-resistance. But the rubber composition composing the inner core 20 is surrounded with that composing the outer layer 21. Therefore, the bar 2 has a superior weatherability and crack-resistance.

Hydrogenated nitrile rubber used as the base rubber of the rubber composition composing the inner core 20 leads to the formation of a rubber composition containing the metallic salt of α, β-unsaturated fatty acid superior in weatherability and crack-resistance and great in flexural elastic modulus. But the hydrogenated nitrile rubber is 30 to 40 times as expensive as butadiene rubber and isoprene rubber used as the base rubber of the conventional rubber composition composing the inner core of a bar. Thus, it is economical to provide the rubber composition composing the outer layer 21 with weatherability and crack-resistance.

The rubber composition composing the outer layer 21 is separated from the mold favorably, while the rubber composition composing the inner core 20 containing the metal salt of α, β-unsaturated fatty acid is not separated from the mold as favorably as the rubber composition composing the outer layer 21.

A fourth embodiment of the present invention is described below with reference to FIG. 9. A fiber layer 30 is interposed between the inner core 20 and the outer layer 21.

Even though the outer layer 21 cracks, the inner core 20 can be prevented from being cracked due to the presence of the fiber layer 30.

Short fiber may be added to the rubber composition composing the inner core 20 similarly to the second embodiment to reinforce the rubber composition composing the inner core 20. The rubber composition composing the inner core 20 is vulcanized in a mold with the short fiber oriented in the axial direction of the bar 2 so as to increase the strength of the rubber composition in the axial direction thereof. As a result, the inner core 20 has the ability to maintain its original configuration.

The bar consisting of the molded rubber composition can be effectively used as the marine-structural material which is required to be light, weather resistant, crack-resistant, wear-resistant, and corrosion-resistant to the salt contained in sea-water. For example, the bar can be used as a pontoon, a breakwater net, a sea water-surface partitioning fence, or the like floating on the sea water.

As apparent from the foregoing description, the molded rubber composition according to the present invention satisfies the conditions required for a marine-structural material, such as fish-cultivating frame, because the molded rubber composition has a high flexural rigidity, the ability to hold its configuration, a high breaking extension, is deformable with the swelling motion of waves, is light, is corrosion-resistant to the salt of the sea-water, is weather resistant, and is durable.

In particular, the molded rubber composition of the present invention is anisotropic in that its strength in the direction in which stresses are repeatedly applied by waves is greater than in other directions, i.e., the elastic modulus thereof has anisotropy. Thus, the molded rubber composition has a favorable configuration-holding performance.

In addition, the molded rubber composition is less expensive than other materials and is easy to process. Therefore, the marine-structural material comprising the molded rubber composition can be utilized as the marine-structural material easily, and at a low cost.

The molded rubber composition reinforced with short fibers has a high strength and a high elastic modulus. In addition, the short fibers are oriented in a certain direction to improve the flexural rigidity thereof against tide. Thus, the molded rubber composition has a superb configuration-holding performance.

Furthermore, since the rubber composition composing the inner core of the bar of the marine-structural material has a higher flexural elastic modulus (flexural rigidity) than conventional rubber compositions, the bar is able to hold its configuration without changing the sectional area thereof. Accordingly, the deformation degree of the bar in a horizontal direction can be reduced to a great extent and is hence durable.

The rubber composition composing the inner core is inferior to that of the outer layer in terms of weatherability, wear-resistance, waterproof, crack-resistance, and resistance to cutting. But the rubber composition composing the inner core is surrounded by the rubber composition composing the outer layer. Therefore, the marine-structural material has the above properties.

The rubber composition composing the inner core holds the original configuration of the bar, and the rubber composition composing the outer layer has the above properties and inexpensive. Therefore, the marine-structural material comprising the molded rubber composition is durable and inexpensive and further can be easily molded.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A portion of a fish-cultivating frame or a pontoon frame, comprising a rubber composition which has been shaped by vulcanization into a predetermined configuration, wherein said rubber composition comprises a base rubber and in an amount sufficient to co-crosslink said rubber, a metal salt of an $\alpha$, $\beta$-unsaturated fatty acid.

2. The portion of a fish-cultivating frame or pontoon frame as defined in claim 1, wherein said rubber composition comprises 100 parts by weight of base rubber; 10 to 70 parts by weight of said $\alpha,\beta$-unsaturated fatty acid; 10 to 70 parts by weight of metal oxide; metal hydroxide or carbonate; and 0.5 to 5.0 parts by weight of organic peroxide.

3. The portion of a fish-cultivating frame or pontoon frame as defined in claim 1, wherein the metal of said metal salt is selected from the group consisting of zinc and magnesium.

4. The portion of a fish-cultivating frame or pontoon frame as defined in claim 2, wherein the metal of said metal salt is selected from the group consisting of zinc and magnesium.

5. The portion of a fish-cultivating frame or pontoon frame as defined in claim 1, wherein said rubber composition has been prepared by kneading under a shearing force in a certain direction, and then vulcanizing in a mold, wherein crystals of said metal salt of said $\alpha,\beta$-unsaturated fatty acid in said rubber composition are oriented in the same direction, and wherein aid rubber composition has a greater strength in said direction than in any other directions.

6. The portion of a fish-cultivating frame or pontoon frame as defined in claim 2, wherein said rubber composition has been prepared by kneading under a shearing force in a certain direction, and then vulcanizing in a mold wherein crystals of said metal salt of said $\alpha,\beta$-unsaturated fatty acid in said rubber composition are oriented in the same direction, wherein said rubber composition has a greater strength in said direction than in any other directions.

7. The portion of a fish-cultivating frame or pontoon frame as defined in claim 6, wherein said predetermined configuration of said vulcanized rubber composition is an anisotropic long bar having an axial and a radial direction, wherein the elastic modulus in the axial direction of aid bar is higher than the elastic modulus in said radial direction of said bar.

8. The portion of a fish-cultivating frame or pontoon frame as defined in claim 1, wherein said rubber composition further comprises short fibers.

9. The portion of a fish-cultivating frame or pontoon frame as defined in claim 2, wherein said rubber composition further comprises 5 to 30 parts by weight of short fibers.

10. The portion of a fish-cultivating frame or pontoon frame as defined in claim 8, wherein said rubber composition has been prepared by kneading under a shearing force in a certain direction, and then vulcanizing with said short fibers oriented in a certain direction, and wherein said short fibers and said rubber composition have a greater strength in said direction than in other directions.

11. The portion of a fish-cultivating frame or pontoon frame as defined in claim 10, wherein said predetermined configuration of said vulcanized rubber composition is an anisotropic long bar having an axial direction and a radial direction, wherein said short fibers are oriented in the axial direction of said long bar, and wherein the elastic modulus in said axial direction of said long bar is higher than the elastic modulus of said long bar in said radial direction.

12. The portion of a fish-cultivating frame or pontoon frame as defined in claim 1, wherein said portion comprises an inner core and an outer layer surrounding said inner core, wherein said inner core comprises said rubber composition comprising said metal salt of said $\alpha,\beta$-unsaturated fatty acid, and said outer layer comprises a second rubber composition having superior weatherability, corrosion-resistance and crack-resistance, integrated with said rubber composition of said inner core.

13. The portion of a fish-cultivating frame or pontoon frame as defined in claim 12, further comprising a fiber layer interposed between said rubber composition which comprises said inner core, and said second rubber composition which comprises said outer layer which surrounds said inner core.

14. The portion of a fish-cultivating frame or pontoon frame as defined in claim 12, wherein said rubber composition which comprises said inner core further comprises short fiber as a reinforcing material.

15. The portion of a fish-cultivating frame or pontoon frame as defined in claim 12, wherein said rubber composition which comprises said inner core has been prepared by kneading under a shearing force in a certain direction, wherein crystals of said metal salt of said $\alpha,\beta$-unsaturated fatty acid in said rubber composition which comprises said inner core are oriented in said direction and then vulcanized together with said second rubber composition which comprises said outer layer surrounding said inner core, and wherein said fish-cultivating frame or pontoon frame has a greater strength in said direction than in any other directions.

16. The portion of a fish-cultivating frame or pontoon frame as defined in claim 12, wherein said predetermined configuration of said vulcanized rubber composition is an anisotropic long bar having an axial direction and a radial direction, wherein crystals of said metal salt of said $\alpha,\beta$-unsaturated fatty acid in said rubber composition have been oriented in the axial direction of said long bar, wherein the elastic modulus in said axial direction of said long bar is higher than the elastic modulus of said long bar in said radial direction.

* * * * *